United States Patent [19]

Herault

[11] Patent Number: 5,696,882
[45] Date of Patent: Dec. 9, 1997

[54] METHOD AND APPARATUS FOR USING A NEURAL NETWORK TO EXTRACT AN OPTIMAL SUBSET OF DATA OBJECTS FROM AN AVAILABLE CLASS OF DATA OBJECTS

[75] Inventor: Laurent Herault, Claix, France

[73] Assignee: Commissariat a l'Energie Atomique, Paris, France

[21] Appl. No.: 424,009

[22] Filed: Apr. 18, 1995

[30] Foreign Application Priority Data

May 2, 1994 [FR] France ................... 94 05323

[51] Int. Cl.$^6$ ........................... G06F 15/18
[52] U.S. Cl. ................ 395/23; 395/22; 395/24; 395/21
[58] Field of Search ............ 395/23, 22, 24, 395/21

[56] References Cited

U.S. PATENT DOCUMENTS

| | | | |
|---|---|---|---|
| 4,918,618 | 4/1990 | Tomlinson, Jr. ............. | 395/21 |
| 5,195,170 | 3/1993 | Eberhardt ................... | 395/24 |
| 5,210,798 | 5/1993 | Ekchian et al. ............. | 382/103 |
| 5,504,841 | 4/1996 | Tani ........................... | 395/81 |

FOREIGN PATENT DOCUMENTS

| | | |
|---|---|---|
| 0 475 732 | 9/1991 | European Pat. Off. . |
| 0 529 628 | 8/1992 | European Pat. Off. . |

OTHER PUBLICATIONS

Churchland et al., "The Computational Brain," The MIT Press, Cambridge, MA, Dec. 30, 1992.

Chuanyi and Psaltis (1991) "The Capacity of a Two Layer Network with Binary Weights," Neural Networks, 1991 IEEE International Conference (Seattle), vol. II p. 127, Dec. 1991.

Jagota (1993) "Optimization by Reduction to Maximal Clique,"Neural Networks, 1993 IEEE International Conference, p. 1526, Dec. 1993.

Jagota et al. (1994) "Information Capacity and Fault Tolerance of Binary Weights Hopfield Nets," Neural Networks, 1994 IEEE International Conference, vol. II, p. 1044, Dec. 1994.

Yuan and Chen (1990) "Neural Net Decoders for Some Block Codes," IEE Proceedings. Part I: Communications, Speech, and Vision, vol. 137, Pt I, No. 5, p. 309, Oct. 1990.

van Hemmen and Kuhn (1986) "Nonlinear Neural Nets," Physical Review Letters, vol 57, No. 7, p. 913, Dec. 1986.

(List continued on next page.)

*Primary Examiner*—David K. Moore
*Assistant Examiner*—Ji-Yong D. Chung
*Attorney, Agent, or Firm*—Burns, Doane, Swecker & Mathis, LLP

[57] ABSTRACT

Method and apparatus for selecting an optimized subset of trajectories from an available class of potential trajectories in a velocimetry application. In an exemplary method, a neural network is constructed wherein each neuron in the network represents a trajectory in the overall class. A binary output of each neuron indicates whether the object represented by the neuron is to be selected. In the exemplary method, the neural network is in an initially converged state. The network is then alternately excited and constrained so that it settles to additional converged states. During excitation, correction factors including a parameter-optimizing term are applied to neuron input potentials. During constraint, the parameter-optimizing terms are interrupted. Each time the network converges, the outputs of the neurons in the network are decoded to establish a subset of trajectories to be selected, and a value for an optimization parameter associated with the established subset is computed. The excitation and constraint phases are repeated in an attempt to establish subsets of trajectories having superior optimization parameter values. Once the excitation and constraint phases have been repeated a suitable number of times, the trajectories identified in a subset of objects having a superior optimization parameter value are selected. In exemplary embodiments, neurons are updated in a novel block-sequential fashion.

15 Claims, 3 Drawing Sheets

OTHER PUBLICATIONS

Hertz et al. "Introduction to the Theory of Neural Computation," Addison–Wesley Publishing Company, Mar. 1992, Dec. 1991.

Optimal Control With A Recurrent Neural Network And A Priori Knowledge Of The System—Hoshino, et al.—1991 IEEE International Joint Conference On Neural Networks—vol. 1, 18 Nov. 1991, Singapore—pp. 226–231.

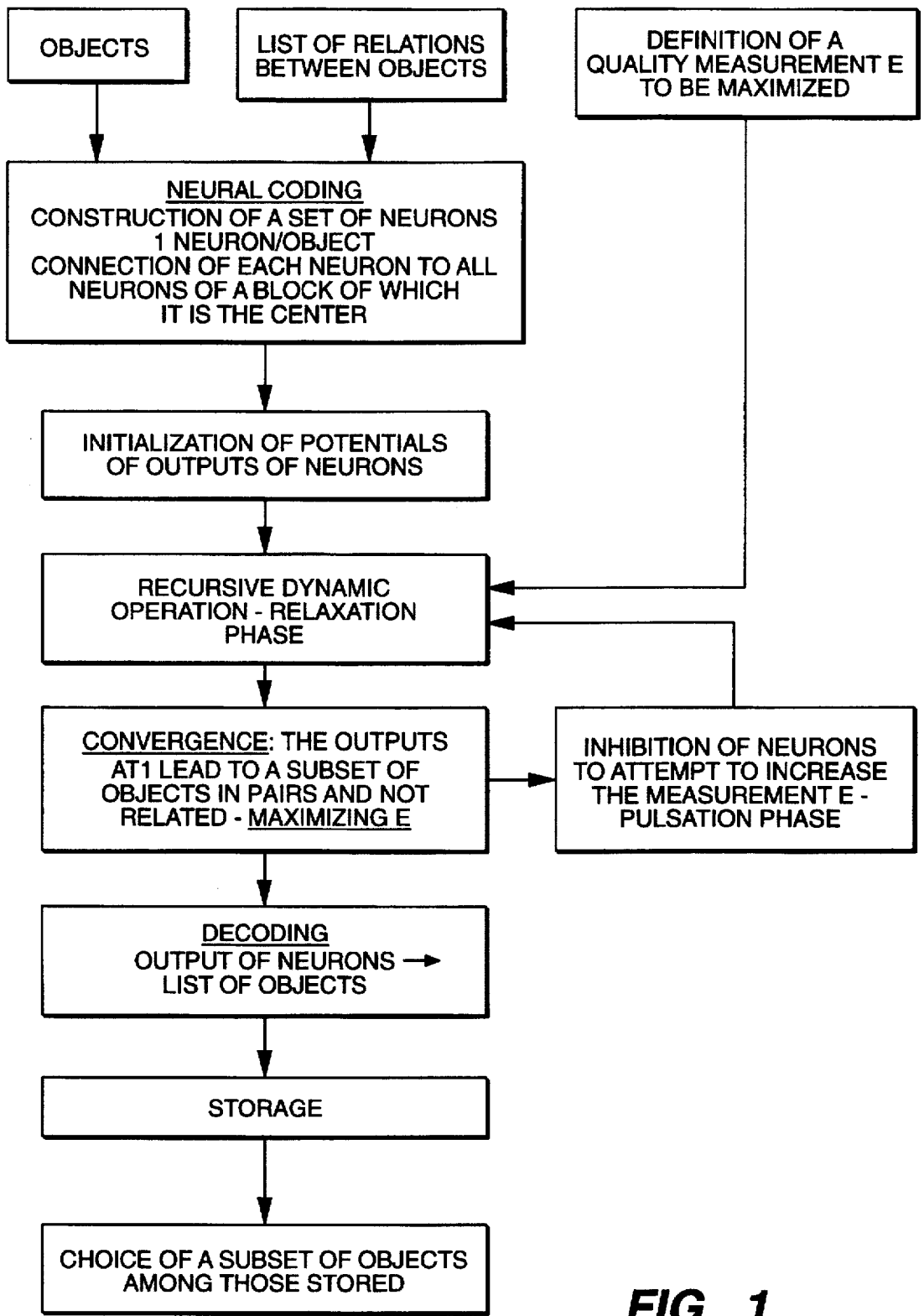
FIG._1

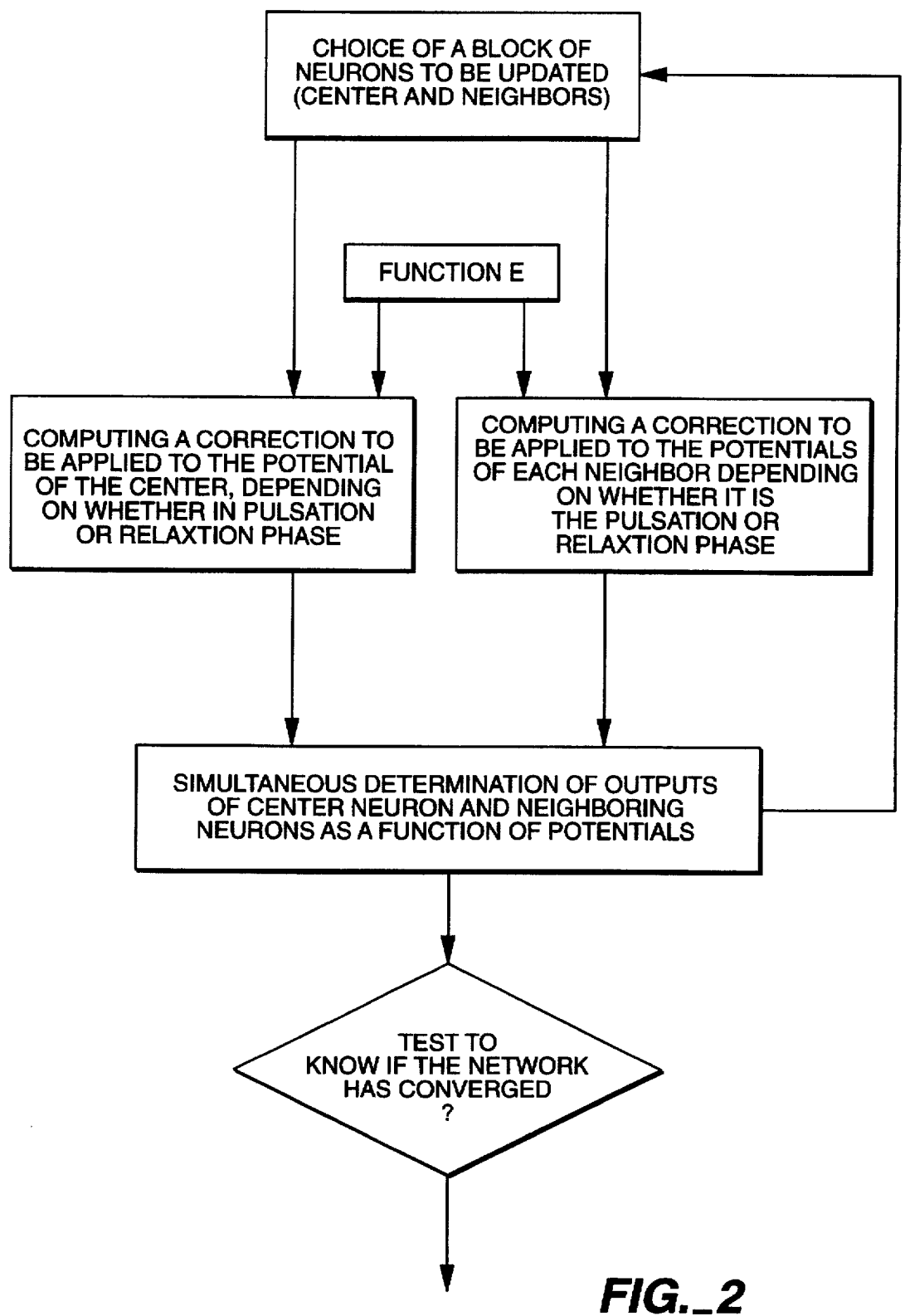
FIG._2

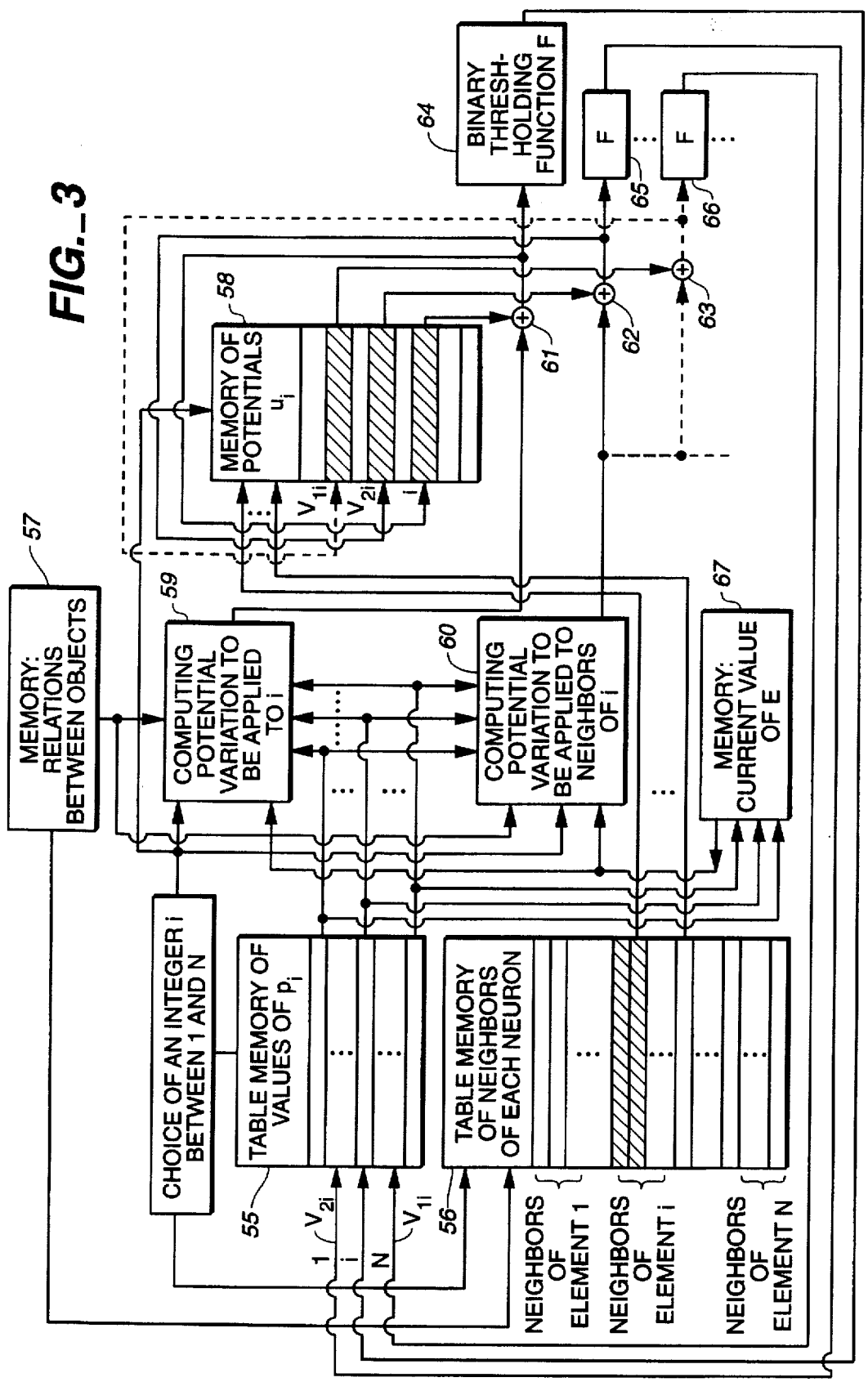
FIG._3

5,696,882

METHOD AND APPARATUS FOR USING A NEURAL NETWORK TO EXTRACT AN OPTIMAL SUBSET OF DATA OBJECTS FROM AN AVAILABLE CLASS OF DATA OBJECTS

DESCRIPTION

1. Technical Field

The present invention relates to a process and a device for the extraction of a subset of objects optimizing a measurement and using a neural network.

2. Prior Art

Neuromimetic networks have been widely studied for many years and various applications have been developed, particularly for the resolution of shape recognition and optimization problems.

Neuromimetic networks use a digital information and are systems performing calculations based on the behaviour of physiological neurons. A neuromimetic model is characterized by three basic parts, i.e. a network of formal neurons, an activation rule and evolution dynamics.

The network is formed from a set of formal neurons. A formal neuron is an arithmetic unit constituted by an input, called potential (designated u) and an output, corresponding to a digital activation level (called p). At each instant, the activation level of each neuron is communicated to other neurons. Thus, the neurons are connected together by weighted connections, called synaptic weights. The weight of the connection between the output of the neuron i and the input of the neuron j is designated $w_{ij}$. The total activation quantity at the input $u_j$ received by the neuron j from the other neurons at each instant is used by said neuron to update its network. It is sometimes called the potential (or activation potential) of the neuron j. The activation rule of a neuromimetic network is a local procedure followed by each neuron on updating its activation level as a function of the activation context of the other neurons. Thus, the output of a neuron is given by a non-linear transfer function applied to the potential. This non-linear function can be a threshold function, which is also known as the MacCullogh and Pitts function and defined by the neuron i considered at the date t, by:

$$\begin{cases} p_i(t) = 1 & \text{if } u_i(t) > 0 \\ p_i(t) = 0 & \text{if } u_i(t) < 0 \\ p_i(t) = p_i(t-1) & \text{if } u_i = 0 \end{cases} \quad (1)$$

The evolution dynamics constitutes the rule permitting the updating of neurons. At the outset (t=0), the outputs of neurons are drawn at random (0 or 1) and then the network evolves by updating its neurons. In order to update a neuron i at instant t, its potential at said date is calculated:

$$u_i(t) = u_i(t-1) + \Delta u_i(t) \quad (2)$$

The potential variation $\Delta u_i(t)$ will correspond to the evolution dynamics. Different models exist in the prior art for defining said dynamics. According to the sign of $\Delta u_i(t)$ between two updatings of the neuron i, it is said that the neuron is inhibited (negative potential variation tending to bring the output to 0) or excited (positive potential variation tending to bring the output to 1). If its potential is strictly positive, the neuron places its output at 1 and it is activated. If its potential is strictly negative it places its output at 0 and is deactivated. If its potential is 0, the value of the output remains unchanged. Thus, the output of neuron i can be induced to change between two updatings. It is said that the network has converged if, for each neuron, no updating modifies the potential of the neuron. The convergence mode is defined by the order in which the neurons are updated. Its choice is of great importance for the quality of the convergence. The convergence mode can be:

asynchronous: one neuron is updated at once, the new output calculated during its updating being used for the updating of the other neurons and the neurons can be sequentially updated in a fixed order (reference is then made to sequential asynchronous mode) or in random manner (reference is then made to random asynchronous mode);

synchronous: all the neurons are updated simultaneously;

synchronous by block: the neuron blocks are synchronously updated.

Certain evolution dynamics will now be given for solving the optimization problems.

The model used as a basis for the main neural optimization algorithms is the model presented by J. Hopfield and D. Tank in the article entitled "Neural computation of decisions in optimization problems" (Biological Cybernetics, vol. 52, pp. 141–152, 1985). They define an energy function E:

$$E = -\frac{1}{2} \sum_{i=1}^{n} \sum_{j=1}^{n} w_{ij} \cdot p_i \cdot p_j - \sum_{i=1}^{n} I_i \cdot p_i \quad (3)$$

The neural outputs $p_i$ are analog between 0 and 1 and $I_i$ represents an input bias. This energy can be seen as the physical energy of a spin glass system. As the energy E encodes the problem, the latter amounts to minimizing said energy at the convergence of the network. J. Hopfield in an article entitled "Neural networks and physical systems with emergent collective computational abilities" (Proceedings of the National Academy of Sciences vol. 79, pp. 2554–2558, 1982) demonstrates in the Hopfield theorum that:

if the evolution dynamics of the network are:

$$\Delta u_i(t) = -\frac{\Delta E}{\Delta p_i}(t)$$

if the activation rule used is that of MacCullogh-Pitts, and if the matrix of the synaptic weights is symmetrical ($w_{ij}=w_{ji}$), then, for any neuron i and at any date t:

$$\frac{\Delta E}{\Delta t}(t) \leq 0$$

Thus, the energy will decrease, during the evolution of the system, until it reaches a minimum.

In the prior art, the operator adjusts parameters in order to establish compromises between satisfying constraints and optimizing the measurement.

The process of the invention makes it possible to know if a solution is or is not related with the others. This knowledge guarantees both the satisfying of all the constraints linked with the considered application and the optimization of the measurement.

The object of the invention is to propose a process and a device for extracting a subset of objects obtained from a set, in pairs and related or not related and optimizing a measurement which can advantageously use an original neuromimetic network.

OBJECT OF THE INVENTION

The invention relates to a process for the extraction of a subset of objects, such as potential trajectories in a velocimetry application, optimizing a measurement, using a neural network, characterized in that it comprises the following stages:

a stage of constructing a recursive neural network from objects and relations between the objects by associating with each object the binary output of a formal neuron $p_i(t)$ at a date t:

$p_i(t)=1 \rightarrow$ the object belongs to the sought subset, $p_i(t)=0 \rightarrow$ the object does not belong to the sought subset;

a stage of using an inhibiting process in order to obtain subsets of objects in pairs which are or are not related and for passing from one subset to another on trying to increase the quality of the solution;

a stage of initializing the output and the potential associated with each neuron;

a stage of recursive dynamic operation of the network;

a stage of choosing the best from among the listed subsets by comparing qualities.

Advantageously, the stage of initializing the output and the potential associated with each neuron is such that the output and potential associated with each neuron prove, for each neuron, the following conditions:

on the outputs of the neurons: if initialization takes place of a neuron i with an output representing 1 (activated neuron), then the neurons j corresponding to objects related to the object i ($e_{ij}=1$) must be deactivated:

$$(p_i(t=0)=1) \rightarrow (\forall j \in \{1 \ldots N\}\ e_{ij}=1 \rightarrow p_j(t=0)=0)$$

on the potentials:

$$p_i(t=0)=1 \leftrightarrow u_i(t=0) \geq 0$$

$$p_i(t=0)=0 \leftrightarrow u_i(t=0) \leq 0$$

Advantageously in the case of seeking objects pairwise and related, the stage of initializing the output and the potential associated with each neuron is such that the output and the potential associated with each neuron prove, for each neuron, the following conditions:

on the outputs of neurons: on initializing a neuron i with an output representing 1 (activated neuron) then the neurons j corresponding to object not related with the object i ($e_{ij}=0$) must be deactivated:

$$(p_i(t=0)=1) \rightarrow \forall j \in \{1 \ldots N\}\ e_{ij}=0 \rightarrow p_j(t=0)=0)$$

on the potentials:

$$p_i(t=0)=1 \leftrightarrow u_i(t=0) \geq 0$$

$$p_i(t=0)=0 \leftrightarrow u_i(t=0) \leq 0$$

Advantageously, the recursive dynamic operating stage for the network comprises an updating of the set of neurons of the network in a certain order (e.g. random or sequential) simultaneously considering the neurons of a block constituted by a neuron i (centre) and the neighbouring neurons j associated with the objects which are respectively related or not related therewith (neurons j for which $e_{ij}=1$ respectively $e_{ij}=0$) (reference is made to the blockwise synchronous convergence mode). In order to update this block, application simultaneously takes place to the potentials of the various neurons of the block corrections, which are dependent on the values of the outputs of the other neurons and relations existing between the objects, the mathematical expression of the correction to be applied to the potential of a neuron differing according to whether it is considered as the centre of a block or as neighbours of a centre of another block. The corrections are defined in such a way that as soon as a neuron i is activated, all the neurons j proving $e_{ij}=1$ or respectively $e_{ij}=0$ are deactivated at the same time.

The invention also relates to a device comprising a neural network incorporating:

a choice circuit for an integer i between 1 and N, a first table memory of the values of the outputs $p_i$ of the neurons connected to the output of the choice circuit of an integer, a second table memory of the neighbours of each neuron connected to the output of the choice circuit of an integer, a third memory of relations between the objects connected to the input of the second memory, a fourth memory of potentials of neurons connected to the output of the second memory and to the output of the choice circuit of an integer, a fifth memory containing the current value of the quality function E to be optimized connected to the output of the first memory, a first computing circuit making it possible to compute the potential variation to be applied to the neuron i connected to the output of the choice circuit of an integer, to the output of the fifth memory, to the output of the third memory and to the output of the first memory, a second computing circuit making it possible to compute the potential variation to be applied to neighbouring neurons of the neuron i connected to the outputs of the choice circuit and the fifth, third and first memories, a first adder receiving the outputs of the first computing circuit and the fourth memory and connected at the input to the fourth memory, at least one second adder receiving the outputs of the second computing circuit and the fourth memory and connected at the input to the fourth memory, at least two binary thresholding function circuits F respectively connected to the outputs of said two adders and to the input of the first memory.

This neural network is applicable to processes for the optimum control of means in time relating in general terms to:

velocimetry, resolution of routing problems in telecommunications networks, optimization of communications between satellites, optimization of component arrangement geometry in CAD, planning flight schedules, planning industrial production.

BRIEF DESCRIPTION OF THE DRAWINGS

FIG. 1 illustrates the different stages of the process according to the invention.

FIG. 2 illustrates the dynamic operating stage.

FIG. 3 illustrates a neural network associated with the device for performing the process of the invention.

DETAILED DESCRIPTION OF EMBODIMENTS

The lexicon at the end of the description forms part thereof.

In order to facilitate the description hereinafter will be given the case where subsets are sought pairwise which are not related. Obviously the invention also applies to seeking subsets of objects in pairs and which are related by substituting the matrix ($1-e_{ij}$) for the matrix ($e_{ij}$) of relations.

The process of the invention comprises several stages as illustrated in FIG. 1.

Use is made of a formal neural network able to determine a subset of objects in pairs, not related and of maximum quality, where the quality is measured by a random function E ($\{p_i\}$) of the outputs of the neurons. The following stages are involved:

construction of a recursive neural network from objects and relations between the objects associating with each object the binary output of a formal neuron $p_i(t)$:

$p_i(t)=1 \rightarrow$ the object belongs to the sought subset, $p_i(t)=0 \rightarrow$ the object does not belong to the sought subset;

use of an inhibiting process in order to obtain subsets of objects in pairs and not related, passage taking place from one subset to another on attempting to increase the quality of the solution;

initializing the output and the potential associated with each neuron in such a way that they prove, for each neuron, the following conditions: on the outputs of the neurons: on initializing a neuron i with an output representing 1 (activated neuron), then the neurons j corresponding to objects related to the object i ($e_{ij}=1$) must be deactivated, $$(p_i(t=0)=1) \rightarrow (\forall j \in \{1, \ldots, N\}\ e_{ij}=1 \rightarrow p_j(t=0)=0)$$

on the potentials $$p_i(t=0)=1 \leftrightarrow u_i(t=0) \geq 0$$

$$p_i(t=0)=0 \leftrightarrow u_i(t=0) \leq 0$$

recursive dynamic operation of the network: an updating of the set of neurons of the network takes place in a certain order (e.g. random or sequential) simultaneously considering the neurons of a block constituted by a neuron i (centre) and neighbouring neurons associated with the objects related with the object i (neurons j for which $e_{ij}=1$).

In order to update this block, simultaneous application takes place to the potentials of the neurons of the block corrections dependent on the values of the outputs of the other neurons and relations existing between the objects. The mathematical expression of the corrections to be applied to the potential of a neuron differs according to whether it is considered to be the centre of a block or as a neighbour of a centre of another block. The corrections are defined in such a way that as soon as a neuron i is activated, all the neurons j proving $e_{ij}=1$ are deactivated at the same time.

Dynamic operation generates subsets of objects in pairs and which are related, each of the subsets being associatable with a local maximum of the quality function.

Whenever the network has converged, following the decoding of the outputs of the neurons, a subset of objects in pairs and not related is obtained, which locally maximises the quality function. Each of these subsets is stored. Globally a list of solution subsets is obtained with a choice of the best from among the listed subsets by comparing qualities.

Recursive dynamic operation of said second neural network.

Updating takes place of the "block" of neurons (i and neurons j related to i) corresponding in synchronous manner (all the neurons of the block are simultaneously updated) considering the neuron i as being the "centre" of the block and the neurons j as the "neighbours" of the centre.

Thus, dynamic operation consists of scanning the set of blocks of neurons in a certain order (asynchronous dynamics) and updating the neurons of each block in synchronous manner, reference being made to synchronous dynamics by block or block-synchronous.

Determination of the correction to be applied to the potential $u_i$ of a neuron i at a date t.

It differs as a function of whether the neuron whose potential is to be corrected is considered as being the centre of a block or as the neighbour of another centre. On considering a neuron block of centre i and neighbours $V=\{j\}$ (for any j in V, $e_{ij}=1$) at the date t, consideration is given to whether the neuron i is or is not activated:

if the neuron i is activated the block is left unchanged, if the neuron i is deactivated, the following stages are performed: storage takes place of the value of the measurement of the quality obtained at the date $t-1$: $E\ (\{p_j(t-1)\})$;

the following evolution of the network is tested, the neuron i is activated and the neighbouring neurons j deactivated if the latter were activated and from this is deduced the variation of the measurement of the corresponding quality $\Delta E\ (\{p_j(t-1)\})$ A) The correction to be applied to the potential of the neuron i includes a linear combination of two terms:

One term tends to excite the neuron i, if neuron i is deactivated, with a certain probability as a function of the optimization parameter $\Delta E\ (\{p_j(t-1)\})$. For example, the excitation term may be given by:

$\max(0, \Delta E\ (\{p_j(t-1)\}))$, $(1-p_i(t)).\max(0, \Delta E\ (\{p_j(t-1)\}))$, the results of a Metropolis conducted at a certain temperature in a simulated annealing method, or the results of a Creutz procedure conducted at a certain energy in a microcanonic annealing method.

Also, if the network has been updated less than a certain number of times since the last convergence of the network, then an inhibiting term is applied in an attempt to increase the quality of the subset of objects decoded at the next convergence of the network. Otherwise, an interruption process prevents the inhibiting term from being included in the correction applied to the potential of the neuron i.

For example, this inhibition can consist of:

inhibiting a certain number of neurons, fixed by the user and drawn at random, inhibiting a random number of neurons drawn in random manner, inhibiting neurons among those corresponding to objects incompatible with many others.

Globally, the network alternates pulsation phases (when the last inhibition is taken into account) and relaxation phases (when the interruption process stops the taking into account of the inhibition). During the relaxation phase the network converges. Once the network has converged, an inhibition is again applied (pulsation phase). Thus, the pulsation and relaxation phases are alternated a certain number of times fixed by the user (as a function of the time which he has for finding a solution and the quality of the solution which he seeks). At the end of each relaxation phase, i.e. at each convergence, the neurons having an output representing 1 encode a subset of objects in pairs and not related.

B) The correction to be applied to the neuron potential j neighbouring i at the date t is given by a term serving to inhibit the neuron j by a quality equal to the excitation received by the neuron i at the same date, e.g. the inhibition can be given by:

$-e_{ij}\max(0, \Delta E\ (\{p_j(t-1)\}))$ if the excitation on i at t is $\max(0, \Delta E\ (\{p_j(t-1)\}))$ $-(1-p_i(t)).\max(0, \Delta E\ (\{p_j(t-1)\})$ if the excitation on i is $(1-p_i(t)).\max(0, \Delta E\ (\{p_j(t-1)\}))$.

Advantageously the potential of each neuron is limited between two values fixed by the user in order to accelerate convergence, e.g:

the potential between the values of the order of magnitude of the corrections to be applied to the potential when the neuron is updated is limited, the values of the potentials are limited between $-10^{-\infty}$ and $10^{-\infty}$, so that any strictly negative correction to be applied to the potential of an activated neuron deactivates it and any strictly positive correction to be applied to the potential of a deactivated neuron activates it.

FIG. 3 gives a device associated with said neural network in the relaxation phase and comprising:

a first table memory 55 of the values of the outputs $p_i$ of the neurons, a second table memory 56 lists neighbours of each neuron, a third memory 57 of relations between the objects, a fourth memory 58 of potentials of neurons, a fifth memory 67, a first computing circuit 59 making it possible to compute the potential variation to be applied to the neuron i, a second computing circuit 60 making it possible to compute the potential variation to be applied to neighbouring neurons of the neuron i, a first adder 61 receiving the outputs of the first computing circuit and the fourth memory, at least one second adder 62 receiving the outputs of the second computing circuit and the fourth memory, at least two thresholding function circuits with a binary memory F respectively connected to the outputs of said two adders.

In the case of a digital device, said different elements are connected (directly or indirectly) to a clock.

LEXICON

Object

An object is a potential trajectory in a velocimetry application.

Neuron

A neuron i is defined by a potential $u_i$ and by a binary output $p_i$. When, during dynamic operation of the network, the neuron is considered at the date t, then:

a calculation takes place of a correction $\Delta u_i(t)$ to be applied to the potential $u_i(t+1) = u_i(t) + \Delta u_i(t)$, the output is updated:

if $u_i(t+1) > 0$ then $p_i(t+1) = 1$ if $u_i(t+1) < 0$ then $p_i(t+1) = 0$ activated neuron $p_i = 1$
deactivated neuron $p_i = 0$.

Relation

Expression of the incompatibility of two potential trajectories in a velocimetry application.

There is a set of objects from which it is wished to extract a subset proving a certain property based on relations between the objects. Considered in pairs, there is or is not a relation (resulting from an application) between the objects. If an object i is related to an object j, then $e_{ij}=1$, if not $e_{ij}=0$ ($e_{ij}$) is the matrix of relations between the objects.

Note: The process is the equivalent of seeking the largest subset of related objects. For this purpose it is sufficient to consider the related matrix ($1-e_{ij}$) and to use the process described in the present invention.

I claim:

1. A method for selecting an optimized subset of trajectories in a velocimetry application, comprising the steps of:

receiving as input a class of potential trajectories and a set of pair-wise relations wherein each pair-wise relation indicates whether two potential trajectories in the class are related to one another;

constructing a neural network including a plurality of neurons, wherein each neuron represents a potential trajectory in the received class, wherein a binary output of each neuron is based on an input potential of the neuron which is in turn based on outputs of neurons in the network, and wherein the output of each neuron indicates whether a represented potential trajectory is to be selected from the received class;

initializing the neural network with a valid initial solution, wherein the input potential and the output of each neuron in the network are stationary and the network is in an initially converged state;

exciting the network by applying correction factors to the input potentials of neurons in the network, wherein a correction factor applied to the input potential of a neuron a) includes an inhibiting term tending to increase an optimization parameter of a subset of trajectories which the neural network indicates is to be selected and b) is based in part on pair-wise relations associated with the neuron and on outputs of neurons in the network;

constraining the network by applying correction factors which do not include an inhibiting term to the input potentials of neurons in the network so that the network achieves a newly converged state, corresponding to an additional valid solution, wherein the input potential and the output of each neuron in the network are stationary;

decoding the outputs of the neurons in the network to establish a subset of trajectories to be selected and computing a value for an optimization parameter associated with the established subset;

repeating said steps of exciting the network, constraining the network, and decoding the outputs of the network to establish a plurality of subsets of trajectories to be selected and a plurality of corresponding optimization parameter values; and selecting trajectories which are identified in an optimal subset of trajectories, wherein an optimization parameter corresponding to the optimal subset is superior to optimization parameters corresponding to other established subsets.

2. The method of claim 1, wherein said steps of exciting the network and allowing the network to relax are accomplished by scanning the network in a block synchronous fashion and updating input potentials and corresponding outputs of neurons within the network.

3. The method of claim 2, wherein correction factors are used to update input potentials, and wherein a correction factor used to update an input potential of a neuron is dependent upon whether the neuron is centered in a block being updated or is instead a neighbor of a neuron which is a center of a block being updated.

4. The method of claim 3, wherein correction factors are applied to an input potential of a neuron such that other neurons which are pair-wise related to the neuron are deactivated when the neuron is activated.

5. The method of claim 1, wherein each pair-wise relation is a binary number indicating whether two neurons are related to one another, and wherein said steps of exciting the network and allowing the network to relax are carried out in an attempt to select an optimum subset of trajectories which are not pair-wise related to one another.

6. The method of claim 5, wherein said step of initializing the network with an initial solution includes the steps of setting outputs of a first set of neurons to indicate that a corresponding set of trajectories are selected and at the same time setting outputs of other neurons which are related to neurons in the first set to indicate that trajectories corresponding to the other neurons are not selected.

7. The method of claim 1, wherein each pair-wise relation is a binary number indicating whether two neurons are related to one another, and wherein said steps of exciting the network and allowing the network to relax are carried out in an attempt to select an optimum subset of trajectories which are pair-wise related to one another.

8. The method of claim 7, wherein said step of initializing the network with an initial solution includes the steps of setting outputs of a first set of neurons to indicate that a corresponding set of trajectories are selected and at the same time setting outputs of other neurons which are not related to neurons in the first set to indicate that trajectories corresponding to the other neurons are not selected.

9. A device for selecting an optimized subset of trajectories in a velocimetry application, comprising:

means for receiving as input a class of potential trajectories and a matrix of pair-wise relations wherein each pair-wise relation indicates whether two potential trajectories in the received class are related to one another;

a neural network including a plurality of neurons, wherein each neuron represents a potential trajectory in the received class, wherein a binary output of each neuron is based on an input potential of the neuron which is in turn based on outputs of neurons in the network, and wherein the output of each neuron indicates whether a represented object is to be selected from the received class;

means for initializing the neural network with a valid initial solution, wherein the input potential and the output of each neuron in the network are stationary and the network is in an initially converged state;

means for exciting the network by applying correction factors to the input potentials of neurons in the network, wherein a correction factor applied to the input potential of a neuron a) includes an inhibiting term tending to increase an optimization parameter of a subset of trajectories which the neural network indicates is to be selected and b) is based in part on pair-wise relations associated with the neuron and on outputs of neurons in the network;

means for constraining the network by applying correction factors which do not include an inhibiting term to the input potentials of neurons in the network so that the network achieves a newly converged state, corresponding to an additional valid solution, wherein the input potential and the output of each neuron in the network are stationary;

means for decoding the outputs of the neurons in the network to establish a subset of trajectories to be selected and for computing a value for an optimization parameter associated with the established subset;

means for repeatedly exciting the network and constraining the network in order to decode and establish a plurality of subsets of trajectories to be selected and a plurality of corresponding optimization parameter values; and means for comparing the optimization parameters to one another and for choosing an optimal subset of trajectories, wherein an optimization parameter corresponding to the optimal subset is superior to optimization parameters corresponding to other established subsets.

10. A device for selecting an optimized subset of data objects from a class of available data objects, comprising:

a first memory storing input potentials corresponding to neurons in a neural network, wherein each neuron represents an object in the available class;

a second memory storing binary outputs corresponding to the neurons, wherein each output indicates whether a represented object is to be selected;

a third memory storing pair-wise relations, wherein each pair-wise relation indicates whether two neurons in the neural network, and therefore two objects in the available class, are related to one another;

a fourth memory storing a list of neighboring neurons for each neuron in the network;

a fifth memory storing a current value of an optimization parameter associated with a selected group of objects;

a number generating circuit generating a number which corresponds to a neuron in the neural network;

a first computing circuit connected to said number generating circuit and to said second, third, and fifth memories computing a first correction factor to be applied in updating an input potential of a neuron specified by the number generating circuit;

a second computing circuit connected to said number generating circuit and to said second, third, and fifth memories computing a second correction factor to be applied in updating input potentials of neurons which are neighbors of a neuron specified by the number generating circuit;

first updating means for applying the first correction factor to update a stored input potential of a neuron specified by the number generating circuit and for updating a stored output of the neuron specified by the number generating circuit based on the updated stored input potential;

second updating means for applying the second correction factor to update stored input potentials of neurons which are neighbors of a neuron specified by the number generating circuit and for updating stored outputs of the neurons which are neighbors of the neuron specified by the number generating circuit based on the updated stored input potentials;

controlling means for varying the number generated by the number generating circuit to update blocks of neurons in the network and to maximize the value of the optimization parameter.

11. A method for selecting a subset of trajectories from a class of potential trajectories in a velocimetry application using a neural network, comprising the steps of:

receiving as input the class of potential trajectories;

constructing a recursive neural network from potential trajectories and relations between potential trajectories by associating with each trajectory i a binary output $p_i(t)$ of a formal neuron at a time t, wherein $p_i(t)=1$ indicates that a trajectory i belongs to a prevailing subset of trajectories at time t and $p_i(t)=0$ indicates that a trajectory does not belong to a prevailing subset of trajectories at time t;

initializing the output $p_i(t)$ and a potential $u_i(t)$ of each neuron i in the network;

using a recursive dynamic operation of the neural network to update outputs of neurons in the network;

using an inhibiting process to control the recursive dynamic operation of the neural network in order to obtain optimized subsets of trajectories in pairs, wherein trajectories in a pair are one of a) related to one another and b) not related to one another, and wherein optimized subsets are obtained by repeatedly attempting to improve an optimization parameter of a prevailing subset; and choosing a best optimized subset from a list of optimized subsets obtained as a result of said steps of using a recursive dynamic operation of the neural network and using an inhibiting process, wherein an optimization parameter associated with said best optimized subset is superior to optimization parameters associated with other optimized subsets in the list.

12. The method of claim 11, wherein pairs of trajectories which are not related are sought, and wherein said step of initializing the output and a potential of each neuron includes the steps of:

initializing the outputs of neurons in the network such that for every neuron i initialized to have an output of 1, indicating that the neuron i is activated, every neuron j corresponding to a trajectory which is related to a trajectory corresponding to the neuron i is initialized to have an output of 0, indicating that the neuron j is deactivated; and initializing the potentials of neurons in the network such that every neuron having an output of 1 has a potential greater than or equal to 0 and every neuron having an output of 0 has a potential less than or equal to 0.

13. The method according to claim 11, wherein pairs of trajectories which are related are sought, and wherein said step of initializing the output and a potential of each neuron includes the steps of:

initializing the outputs of neurons in the network such that for every neuron i initialized to have an output of 1, indicating that the neuron i is activated, every neuron j corresponding to a trajectory which is not related to a trajectory corresponding to the neuron i is initialized to have an output of 0, indicating that the neuron j is deactivated; and initializing the potentials of neurons in the network such that every neuron having an output of 1 has a potential greater than or equal to 0 and every neuron having an output of 0 has a potential less than or equal to 0.

14. The method of claim 11, wherein said step of using a recursive dynamic operation of the network comprises the step of updating neurons in the network in one of 1) a random order and 2) a sequential order by applying corrections to input potentials of neurons, wherein a correction applied to an input potential of a neuron is dependent upon output values of other neurons and upon relations existing between trajectories, wherein a block of neurons defined by a center neuron i and neighboring neurons j associated with trajectories which are related to a trajectory associated with the center neuron i are updated as a group, wherein a correction applied to the potential of a neuron is dependent upon whether the neuron is considered to be a center neuron or a neighboring neuron, and wherein corrections are defined such that, when a neuron i is activated, neurons j associated with trajectories related with a trajectory associated with the neuron i are deactivated.

15. A device for selecting a subset of trajectories from a class of potential trajectories in a velocimetry application using a set of neurons, wherein said set of neurons comprises:

a selection circuit for selecting and providing an output corresponding to an integer i in a range 1 to N;

a first table memory of outputs $p_i$ of the set of neurons, wherein said first table memory receives the output of said selection circuit;

a second table memory of neighbors of each neuron, wherein said second table memory receives the output of said selection circuit;

a third memory of relations between trajectories connected to an input of said second memory;

a fourth memory of potentials of neurons connected to an output of said second memory and to an output of said selection circuit;

a fifth memory, connected to an output of the first memory, containing a current value of a quality function E which is to be optimized;

a first computing circuit for computing a potential variation to be applied to a neuron i, wherein said first computing circuit is connected to an output of said selection circuit, to an output of said fifth memory, to an output of said third memory and to an output of said first memory;

a second computing circuit for computing a potential variation to be applied to neighboring neurons of a neuron i, wherein said second computing circuit is connected to outputs of said selection circuit and said fifth, third and first memories;

a first adder receiving outputs of said first computing circuit and said fourth memory and connected to an input of said fourth memory;

at least one additional adder receiving outputs of said second computing circuit and said fourth memory and connected to an input of said fourth memory; and at least two binary thresholding function circuits connected, respectively, to outputs of said first adder and said at least one additional adder and connected to an input of said first memory.

* * * * *